A significant advantage of this invention is that a method for the recovery of a high percentage of the ammonium halide is achieved. One of the disadvantages of a process for the dehydrogenation of organic compounds with halogen is that the halogen must be recovered from the unsaturated organic compound. If steam is used in the dehydrogenation process, this problem is particularly acute because the halogen may be present in only a minute amount based on the total effluent and when the steam is condensed to separate the steam from the organic phase, a very dilute solution of halogen results. The halogen or hydrogen halide may amount to, for example, less than one percent of the total aqueous solution. To recover halogen by distillation from such a dilute solution requires an excessive amount of energy input. Moreover, such solutions are extremely corrosive and require special equipment for the distillation. However, according to this invention, by using ammonium halide for the catalyst in conjunction with critical amounts of oxygen and by processing the effluent as described a high recovery of the ammonium halide is achieved in a straightforward process, which process is relatively noncorrosive. Moreover, the dehydrogenation process is continuous as there is no required step to regenerate the vapor phase catalyst.

3,274,284
DEHYDROGENATION PROCESS

Olin C. Karkalits, Jr., and Clyde A. Leatherwood, Houston, Tex., assignors to Petro-Tex Chemical Corporation, Houston, Tex., a corporation of Delaware
No Drawing. Filed Mar. 5, 1963, Ser. No. 262,842
7 Claims. (Cl. 260—680)

This invention relates to a process for dehydrogenating organic compounds.

The use of molecular halogen, particularly iodine, or hydrogen halides for the dehydrogenation of organic compounds has been suggested in the literature. However, there are some serious disadvantages to the prior art processes. One of the disadvantages of the prior processes is that only relatively low conversions, selectivities and yields of the products are obtained. An additional disadvantage of some of the prior art processes is that large amounts of halogen are required. Another disadvantage is that no satisfactory method for the recovery of the halogen from the unsaturated product is taught. Because halogens such as iodine are expensive ingredients, not only must a high percent recovery of these materials be obtained, but also a high yield and selectivity of product must be achieved in order to justify the use of these ingredients. Further drawbacks to these processes are that halogens and hydrogen halides are corrosive, particularly at high temperatures. Halogens also catalyze tar and polymer formation.

It is an object of this invention to provide an improved, efficient, economical process for the dehydrogenation of organic compounds. It is also an object to produce an unsaturated product at high levels of conversion, selectivity and yield. Another object of this invention is to provide a process wherein none of the ingredients is required to be regenerated by converting into another form. Still other objects are to provide a dehydrogenation process in which lower amounts of polymer and tar are formed and to provide a dehydrogenation process which requires only a low amount of energy input to the process. These and other objects of the invention have been achieved according to the invention as described below.

Broadly speaking, according to this invention, unsaturated organic compounds may be produced by heating at an elevated temperature in a dehydrogenation zone a mixture of particular ratios of proportions of an organic compound to be dehydrogenated, oxygen, and an ammonium halide. The effluent from the dehydrogenation zone comprises the dehydrogenated organic compound, steam, ammonium halide, and perhaps some oxygen. In a first separation step a portion of the ammonium halide is separated from the effluent to leave a gaseous mixture containing the organic compounds, some oxygen, and steam. This gaseous mixture is then cooled in a second separation step to a temperature low enough to condense no greater than about 75 mol percent of the steam in the gaseous mixture. The resulting aqueous condensate contains most of the remainder of the ammonium halide not removed in the first separation step. The remaining gaseous phase contains the unsaturated organic compound and the remainder of the steam. The aqueous condensate containing the ammonium halide then may be utilized such as by feeding it to the dehydrogenation zone. The unsaturated organic compound is separated from the gaseous phase.

The process of this invention can be applied to a great variety of dehydrogenation processes of organic compounds. Such compounds to be dehydrogenated normally will contain from 2 to 20 carbon atoms, at least one

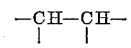

grouping, that is, adjacent carbon atoms each containing at least one hydrogen atom, and a boiling point below about 350° C. Such compounds may contain in addition to carbon and hydrogen other elements such as oxygen, halogens, nitrogen and sulphur. Among the classes of dehydrogenation reactions to which the present invention is applicable are the dehydrogenation of alkanes, alkenes, alkyl halides, ethers, esters, aldehydes, ketones, acids, alkyl aromatic compounds, alkyl heterocyclic compounds, cyanoalkanes, cycloalkanes and the like. Illustrative dehydrogenation processes include the dehydrogenation of ethylbenzene to styrene, isopropylbenzene to methyl styrene, ethylcyclohexane to styrene, cyclohexane to benzene, ethane to ethylene, propane to propylene, isobutane to isobutylene, n-butane to isobutylene, n-butane to butene and/or butadiene, butene to butadiene, butene or butadiene to vinyl acetylene, 2-methylbutene-2 to isoprene, 2-methylpentene-2 to isoprene, propionaldehyde to acrolein, ethyl chloride to vinyl chloride, propionitrile to acrylonitrile, methyl isobutyrate to methyl methacrylate, ethyl pyridine to vinyl pyridine and the like. Additional processes are the dehydrogenation of toluene, the alkyl chlorobenzenes, ethyl naphthalene, isobutyronitrile, propyl chloride, isobutyl chloride, ethyl fluoride, ethyl dichloride, butyl chloride, the chlorofluoroethanes, methylethyl ketone, diethyl ketone, methyl propionate, and the like. The invention is preferably applied to dehydrogenation reactions wherein the dehydrogenated product contains the same number of carbon atoms as the feed compound to be dehydrogenated, but the invention is not so limited. The preferred compounds to be dehydrogenated are aliphatic hydrocarbons of 2 to 6 carbon atoms, which contain at least two adjacent carbon atoms, each of which carbon atom has at least one hydrogen atom attached.

Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly hydrocarbon stream containing predominantly hydrocarbons of four carbon atoms may be produced and may comprise a mixture of butenes together with butadiene, butane, isobutylene, isobutane and other ingredients in minor amounts. These and other refinery by-products which contain normal ethylenically unsaturated hydrocarbons are useful as starting materials. Another source of feedstock is the product from the dehydrogenation of butane to butenes employing the Houdry process. Although various mixtures of hydrocarbons are useful, the preferred hydrocarbon feed contains at least 50 weight percent butene-1, butene-2, n-butane and/or butadiene-1,3 and mixtures thereof, and more preferably contains at least 70 percent n-butane, butene-1, butene-2 and/or butadiene-1,3 and mixtures thereof. Any remainder usually will be aliphatic hydrocarbons. The process of this invention is particularly effective in dehydrogenating aliphatic hydrocarbons to provide a hydrocarbon product wherein the major unsaturated product has the same number of carbon atoms as the feed hydrocarbon.

Preferably steam may be present in the feed to the dehydrogenation zone in an amount of at least about 2.0 mols of steam per mol of organic compound to be dehydrogenated. Generally the amount of steam will be from about 3.0 to 25 or 30 mols of steam per mol of organic compound to be dehydrogenated, although higher amounts may be employed. Preferably the steam will be present in an amount from about 4.0 to 20 mols per mol of organic compound to be dehydrogenated.

The oxygen may be supplied by any source such as pure oxygen or as air. The amount of oxygen will normally be in the range of about 0.20 or 0.25 mol of oxygen to 1.5 or 2.5 mols of oxygen per mol of hydrocarbon to be dehydrogenated. As high as 5 mols of oxygen may be employed but this amount is not preferred. In relation to the total ammonium halide, the amount of oxygen employed will usually be greater than 1.25 mols of oxygen per mol of ammonium halide and ordinarily will be greater than 5.0 or 10.0 mols of oxygen per mol of ammonium halide. Normally the ratio of mols of oxygen to mols of ammonium halide will be from about 2 to 150 or 300 with the best results having been obtained at ratios between about 8 and 150 mols of oxygen per mol of ammonium halide.

Diluents may also be present in the reaction zone. Diluents may be such as nitrogen, helium, carbon dioxide, organic compounds and so forth.

The ammonium halide employed may be ammonium iodide, ammonium bromide, ammonium chloride, or ammonium fluoride and mixtures thereof. Better results are usually obtained with ammonium iodide or ammonium bromide and mixtures thereof, but under certain conditions, good yields may be obtained with ammonium chloride and acceptable yields of desired product may be obtained with ammonium fluoride. Mixtures of these ammonium halides are also suitably employed. Particularly desirable mixtures are those containing from about 5 to 99 mol percent ammonium bromide or from 1 to 90 mol percent ammonium iodide, with any remainder being made up of one or more of the remaining ammonium halides. Mixtures of from 1 to 99 mol percent of ammonium bromide together with from 1 to 99 mol percent ammonium iodide or ammonium chloride are especially suitable. If desired, also included may be amounts of other volatile halogen compounds or elemental halogens, but these normally will not constitute greater than 25 mol percent of the total halogen in all forms. The amount of total ammonium halide used will be greater than 0.0001 mol of ammonium halide per mol of organic compound to be dehydrogenated, and ordinarily at least about 0.001 or 0.005 mol of ammonium halide per mol of organic compound to be dehydrogenated will be employed. Large amounts of ammonium halide may be used, but it is one of the advantages of this invention that very small amounts of ammonium halide are required, such as less than about 0.5 mol of ammonium halide, for example, no greater than 0.3 mol per mol of organic compound to be dehydrogenated. With ammonium bromide alone, it is preferred to employ concentrations from about 0.01 to 0.2 mol of ammonium bromide per mol of organic compound to be dehydrogenated, and with ammonium chloride alone, it is preferred to use concentrations of about 0.05 to 0.5 or 0.75 mol per mol of organic compound to be dehydrogenated. Using ammonium iodide, best results have been obtained with a total amount of ammonium iodide at a concentration from 0.005 to 0.09 or 0.15 mols of ammonium iodide per mol of organic compound to be dehydrogenated. The total amount of ammonium halide will generally be less than 10 mol percent of the total feed to the reactor and ordinarily will be less than 5 mol percent of the total feed.

The manner of mixing the ammonium halide, the compound to be dehydrogenated, oxygen, and steam may be varied. Any of the reactants may be split and added incrementally. For example, part of the ammonium halide may be mixed with the compound to be dehydrogenated and the oxygen. The mixture may then be heated to effect some dehydrogenation and thereafter the remainder of the ammonium halide added to effect further dehydrogenation. The ammonium halide may be introduced into the reactor system as an aqueous solution, which may be added to the reaction system either separately or mixed with the other reactants. The concentration of ammonium halide in solution may be varied depending upon operating conditions and may be as low as one percent up to aqueous solutions saturated with the ammonium halide. When dilute solutions of the ammonium halide are employed the water of the solution may replace part of the steam requirements. The solution is normally preheated prior to entering the reaction zone. Aqueous solutions of ammonium halide from 1 percent to 50 weight percent ammonium halide based on the total weight have been successfully used in the process of this invention and 10 to 45 weight percent solutions are preferred. Ammonium hydroxide and the appropriate hydrogen halide may be mixed either prior to or in the dehydrogenation zone to provide the ammonium halide solution.

The flow rates of the gaseous reactants may be varied quite widely and good results have been obtained with organic compound gaseous flow rates ranging from about 0.10 to about 10 or 25 liquid volumes of organic compound, calculated at 60° F. and 760 mm. of mercury, to be dehydrogenated per volume of reaction zone per hour. The reaction zone is defined as that portion of the reactor which is at a temperature of at least 450° C. Contact times of the gaseous feed in the reaction zone ranging from about 0.001 or 0.01 to about one second have been found to be preferred; however, a wider range of residence times may be employed such as between 0.001 and 30 seconds. Contact time is the calculated dwell time of the reaction mixture in the reaction zone assuming the mols of product mixture are equivalent to the mols of feed mixture.

For conducting the reaction, a variety of reactor types may be employed. Fixed bed reactors may be used and fluid and moving bed systems are advantageously applied to the process of this invention. In any of the reactors suitable means for heat removal may be produced. Tubular reactors of small diameter may be employed and large diameter reactors which are loaded or packed with packing materials are very satisfactory. The total pressure in the dehydrogenation zone will normally be at or in excess of atmospheric pressure, however, vacuum may be used. Higher pressures, such as about 100 or 200 p.s.i.g. may also be employed.

The dehydrogenation may be conducted in the absence of contact catalysts, but better results are obtained if the reaction is conducted in the presence of metal catalysts generally and especially those containing metal atoms of Groups I-A, I-B, II-A, II-B, III-A, III-B, IV-A, IV-B, V-A, V-B, VI-B VII-B, VIII, the lanthanum series elements, thorium, uranium, and mixtures thereof. The preferred catalysts are compounds of elements of Groups I-A, II-A, II-B, IV-A, IV-B, VA, VB, VI-B, VII-B, VIII, and mixtures thereof. These groups are based on the Periodic Table as found on pages 400–401 in the Handbook of Chemistry and Physics, 39th (1957–58) edition, Chemical Rubber Publishing Co. These metal atoms may conveniently be present in the forms of the elemental metal, metal oxides, metal hydroxides, metal salts, such as the halides, or metal compounds which will be converted to these forms under the conditions of reaction. Examples of catalysts would be potassium oxide, magnesium oxide, scandium bromide, lanthanum oxide, palladium oxide, columbium oxide, titanium dioxide, hafnium oxide, zirconium oxide, tungstic acid, vanadium pentoxide, tantalum oxide, chromic oxide, chromic chloride, molybdenum oxide, molybdenum phosphate, manganese oxide, manganese carbonate, manganese phosphate, manganese, manganese acetate, stainless steel, ferric oxide, ferrous oxide, iron phosphate, iron phosphide, nickel oxide, iron carbonate, iron sulfate, copper tubing, copper oxide, copper phosphate, cobalt nitrate, cobaltous oxide, cobaltic oxide, zinc oxide, zinc sulfate, tin oxide, ferric phosphate, lead oxide, antimony oxide, ferric bromide, ferrous chloride, bismuth oxide, bismuth phosphate, bismuth hydroxide, manganous chloride, didymium oxide, cerric oxide, rare earth chlorides or hydrates, cerium phosphate, vanadium oxyphosphate, molybdenum phosphate, thorium dioxide, and uranium dioxide and mixtures thereof. Preferably the catalyst will be in a solid state under the conditions of reaction. Excellent catalysts are those comprising atoms of titanium, zirconium, vanadium, niobium, chromium, molybdenum, manganese, iron, cobalt, nickel, palladium, cerium, thorium and uranium, such as the oxides, phosphates, iodides, bromides, chlorides or fluorides of these elements. Many of the salts, oxides and hydroxides of the metals of the listed groups may change during the preparation of the catalyst, or during the reaction, but such materials still function as an effective compound in the defined process.

In the above descriptions of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. The catalytic compositions are intimate combinations or mixtures of the ingredients. These ingredients may or may not be chemically combined or alloyed. Inert catalyst binding agents or fillers may be used, but these will not ordinarily exceed about 50 percent by weight of the catalytic surface. The weight percent of the defined catalytic atoms will generally be at least 20 percent and preferably at least 35 percent of the composition of the catalyst surface.

When a solid catalyst is utilized the amount may be varied depending upon such variables as the activity of the catalyst, the amount of ammonium halide and oxygen used, the flow rates of reactants and the temperature of reaction. When a solid catalyst is used, the amount of solid catalyst will be present in an amount of greater than 25 square feet of catalyst surface per cubic foot of reaction zone containing catalyst. Better results may be observed at ratios such as at least 50 to 125 square feet of catalyst surface per cubic foot of reaction zone. Of course, the amount of catalyst surface may be much greater when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors including the particle size, particle distribution, apparent bulk density of the particles, amount of active catalyst coated on the carrier, density of the carrier, and so forth. Typical values for the surface to weight ratio are such as about ½ to 200 square meters per gram,[1] although higher and lower values may be used.

Excellent results have been obtained by packing the dehydrogenation reactor with catalyst particles as the method of introducing the solid catalytic surface. The size of the catalyst particles may vary widely, but generally the maximum particles size will pass through a Tyler Standard Screen which has openings of 2 inches, and generally the largest particles of catalyst will pass through a Tyler Screen with 1 inch openings. Very small particles size carriers may be utilized. In order to avoid high pressure drops across the reactor generally at least 50 perecent by weight of the catalyst will be retained by a 10 mesh Tyler Standard Screen which has openings of $1/16$ inch. However, if a fluid bed reactor is utilized, catalyst particles may be quite small, such as from about 10 to 300 microns. Thus, the particles size may be from about 10 microns to those that are no greater than 2 inches in the smallest dimension. If a carrier is used, the catalyst may be deposited on the carrier by methods known in the art such as preparing an aqueous solution or dispersion of the metal or metal compound and then mixing the carrier with the solution or dispersion until the active ingredients are coated on the carrier. The coated particles may then be dried, for example, in an oven. Various other methods of catalyst preparation known to those skilled in the art may be used. When carriers are utilized, these will be approximately of the same size as the final coated catalyst particle, that is, the carriers will generally be retained on 10 mesh Tyler Screen and will pass through a Tyler Screen with openings of 2 inches. Very useful carriers are Alundum silicon carbide, Carborundum, pumice, kieselguhr, asbestos, and the like. The Alundums or other alumina carriers are particularly useful. When carriers are used, the amount of catalyst on the carrier will generally be in the range of about 3 to 85 weight percent of the total weight of the active catalytic material plus carrier. The carriers may be of a variety of shapes, including irregular shapes, cylinders or spheres. Another method of introducing the required surface is to utilize as a reactor a small diameter tube wherein the tube wall is catalytic or is coated with catalytic material. Other methods may be utilized to introduce the catalytic surface such as by the use of rods, wires, mesh or shreds and the like of catalytic material.

The dehydrogenation process will normally be conducted at a temperature of reaction between about 400 or 450° C. to about 850° C. or higher, such as about 1000° C. The temperature of reaction is measured at the maximum temperature in the reactor. The flow rates of the reactants may be varied quite widely and can be established by those skilled in the art.

The effluent from the dehydrogenation zone contains the unsaturated organic product, some unconverted feed, oxygen, steam, and ammonium halide. Based on the total mols of the unsaturated organic product and unconverted organic compound feed to be dehydrogenated in the

---

[1] As measured by the Innes nitrogen absorption method on a representative unit volume of catalyst particles. The Innes method is reported in Innes, W. B., Anal. Chem., 23, 759 (1951).

effluent the steam will be present in at least 2 mols and generally will be within the range of about 3 to 15 or 20 mols per combined mols of the dehydrogenated product and uncoverted feed, but may be as high as 30 mols. The steam will be present in an amount from about 25 to 96 mol percent of the effluent, and preferably will be from 50 to 95 mol percent. The organic phase including dehydrogenated product, any unreacted feed and any decomposition products will usually range from about 3 to 35 mole percent of the effluent.

The effluent gases leaving the dehydrogenation zone will generally be at a temperature of about or greater than 400° C. or 450° C. to 1100° C. depending upon the particular dehydrogenation process. The effluent gases are then cooled by an aqueous quench containing from zero to 50 mole percent ammonium halide, preferably from 0.005 to 45 mol percent ammonium halide. A large portion of the ammonium halide is then separated in a first separation step from the gaseous phase. From about 25 to about 98 mol percent of the ammonium halide is separated out in this step, and preferably from at least 50 or 60 mol percent to 98 mol percent is separated. The separation may be by any means such as by cooling the gases to a temperature of less than 350° C., such as between about 80° C. and 150 or 200° C. to allow the ammonium halide to condense. The condensed ammonium halide may be cooled as by allowing it to plate out on surfaces provided for such purposes, by filtration, by the use of a cyclone separator or by any other method for making the separation from the gases. One convenient method for separating the ammonium halide is by separating the quenched gases at a temperature below 250° C. The remaining gaseous phase will contain water in the form of steam or droplets, a hydrocarbon phase, oxygen or air and the remainder of the ammonium halide. The temperature of the remaining gases will usually be from about 80 C. to 250° C., and these gases will usually contain from about 50 to 95 or 100 mol percent of the total steam present prior to the removal of ammonium halide from the gaseous phase in this separation step.

It is one of the features of this invention that a large percentage of the ammonium halide may be removed from the remaining gaseous phase by an inexpensive technique. It has been found that if in a second separation zone from about 15 to 75 mol percent, and preferably from about 20 to 60 or 70 mol percent, of the steam is condensed from this gaseous mixture, a disproportionate amount of the ammonium halide will be removed from the gaseous phase. For example, if 50 percent of the steam is condensed, the condensate will contain greater than 50 percent of the ammonium halide that was originally in the gaseous phase prior to the condensation of the 50 percent steam. In this second separation zone, a portion of the steam is condensed, as mentioned above. The resulting condensate contains from about 30 to 95 mol percent of the total ammonium halide entering the second separation zone. The ratio of the mol percent ammonium halide recovered in the condensate of this second separation step is at least 10 mol percent greater than the mol percent of the steam condensed in this separation step and will usually be at least 20 percent greater. Normally, the concentration of the ammonium halide in the condensate of this step will be from about 0.001 to about 10 weight percent ammonium halide based on the total weight of the condensate and preferably will be from about 0.005 to 5 weight percent. The apparatus used for this condensation may be a variety of apparatus for cooling gaseous liquids. One or more stages may be used for this step. Useful devices include such as packed scrubbing towers, tube type condensers or towers equipped with bubble cap trays, or open spray towers. More than one condenser may be used to accomplish the desired amount of condensation. A portion of the condensate may be recycled to the sprays in the top of the tower, thus producing additional condensate. If the condensate is used as the cooling water, for efficient operation a cooler may be required in the line from the bottom of the tower to the recycle.

The gaseous phase remaining after the second separation zone contains the organic phase, the remaining uncondensed steam and only a small percentage of the original ammonium halide. In the first and second separation zone at least 80 and preferably at least 90 mol percent of the ammonium halide is removed from the reactor effluent. In the third separation zone the remainder of the steam is condensed. This condensate may be disposed of because it contains only a small percentage of the original ammonium halide. Of course, this remaining ammonium halide may be recovered if desired. It is one of the advantages of this invention that the amount of water formed as condensate in this third separation zone does not have to be further processed to remove ammonium halide. The excess water, which is the uncondensed steam remaining after the second separation step, can be eliminated from the system in this simple manner. If it were necessary to condense all of the steam to recover the ammonium halide, then the aqueous solution would have to be considerably concentrated prior to recycling to the process because of the additional water added to the process stream as a result of water formation in the dehydrogenation zone and from quench water streams.

The organic phase overhead product from the third separation zone may be further purified by any of the methods known in the art for separating these mixtures, such as by fractionation.

*Example 1*

A detailed example of one of the preferred methods of operation according to this invention will be illustrated for the dehydrogenation of n-butene-2 to butadiene-1,3. LHSV refers to the flow rate of the n-butene-2, in terms of liquid volumes of n-butene-2, calculated at 15.6° C. and 760 mm. of mercury, per volume of reaction zone per hour. The reaction zone is defined as the portion of the reactor which is at a temperature of at least 450° C. The percent conversion refers to the mols of n-butene-2 consumed per 100 mols of n-butene-2 fed to the reactor, percent selectivity refers to the mols of butadiene-1,3 formed per 100 mols of n-butene-2 consumed. Percent yield refers to the mols of butadiene-1,3 formed per 100 mols of n-butene-2 fed to the reactor.

A hydrocarbon composition containing 98 mol percent n-butene-2, with the remainder being minor amounts of n-butene-1, n-butane, butadiene-1,3, isobutylene, propylene, and pentane was fed to a tubular fixed bed reactor containing stainless steel as a catalyst. The reactor wall was Vycor.[2] The reactor was packed with ¼ inch diameter by ¼ inch length No. 316 stainless steel rings. The feed to the reactor contained oxygen fed as air in an amount of 0.8 mol of oxygen per mol of n-butene-2. Ammonium bromide was fed in an amount equal to 0.197 mol of ammonium bromide per mol of n-butene-2. The ammonium bromide was fed as an aqueous solution containing 20 weight percent ammonium bromide. Steam was fed to the reactor in an amount equal to 14.6 mols per mol of n-butene-2. The liquid hourly space velocity (LHSV) was 1.0 and the contact time of the reactants with the stainless steel catalyst was about 0.2 second. The inlet temperature was about 500° C. and the inlet pressure was about 10 p.s.i.g. The maximum temperature in the reactor bed was 650° C. Based on the n-butene-2, the yield of butadiene-1,3 was 57.7 mol percent at a conversion of 62.8 mol percent and a selectivity of 92 mol percent. Some water was formed in the

---

[2] Vycor is the trade name of Corning Glass Works, Corning, N.Y., and is composed of approximately 96 percent silica with the remaining being essentially $B_2O_3$.

dehydrogenation zone. The hot exit gases were quenched with water immediately as they left the reactor. The quench water was at a temperature of about 80° C. Most of the quench water was converted to steam. The quenched gases were then at a temperature of 200° C., and were fed directly into a collection chamber. The collection chamber consisted of a reservoir of cool water maintained at a temperature of roughly 80° C. The condensed ammonium bromide dissolved in the water of the collection chamber. Greater than 60 mol percent of the ammonium bromide present in the gaseous stream was collected in this step.

The remaining gaseous stream at a temperature of 160 to 180° C. was fed to the second separation step which consisted of a controlled condenser for the steam. The condenser was a packed column, packed with ½ inch x ½ inch Vycor rings. The hot gases entered the bottom of the tower and passed up through the rings. Water of a temperature of about 25° C. was sprayed from the top of the tower out on the rings. In this tower 50 mol percent of the steam in the gaseous phase was condensed and simultaneously 70 mol percent of the ammonium bromide of the gaseous phase was recovered in the condensate. The gaseous phase remaining after this step contained only about 7 mol percent of the original ammonium bromide leaving the reactor. This gaseous phase was fed to a second condenser in which 50 mol percent of the remaining steam was condensed and approximately 70 mol percent of the 7 mol percent of remaining ammonium bromide was recovered in the condensate.

The overhead from the second condenser was then treated to separate the hydrocarbon phase. The remaining steam was separated by condensation and the condensate which contained a minor amount of ammonium bromide was sewered. The butadiene phase was separated by distillation from the hydrocarbon phase.

*Example 2*

A mixture of n-butene, 8 mols of steam per mol of butene, 0.015 mol of ammonium iodide per mol of butene and air in an amount to supply 0.75 mol of oxygen per mol of butene was dehydrogenated in a fixed bed reactor containing a cobaltic oxide catalyst. The maximum temperature in the reactor bed was 675° C. The hot exit gases at a temperature of about 675° C. were quenched with an aqueous solution of one percent ammonium halide at a temperature of 95° C. The gases were then contacted with water of a temperature of about 50° C. In this step 66 mol percent of the ammonium iodide leaving the dehydrogenation zone was collected in the liquid water phase.

The remaining gaseous stream at a temperature of 160° C. to 175° C. was fed to the second separation step which consisted of a controlled condenser for the steam. The condenser was a packed column, packed with ½ x ½ inch Vycor Raschig rings. The hot gases entered the bottom of the tower and passed up through the rings. Water of a temperature of about 35° C. was sprayed from the top of the tower onto the rings. In this tower 60 mol percent of the steam in the gaseous phase was condensed and 85 mol percent of the ammonium iodide of the gaseous phase was recovered in the condensate. The gaseous phase remaining after this step contained only a small percentage of the original ammonium iodide leaving the reactor. The gaseous phase was fed to a second condenser in which less than 40 mol percent of the remaining steam was condensed and a major portion of the remaining ammonium iodide was recovered in the condensate.

We claim:

1. An improved process for the dehydrogenation of organic compounds which comprises: heating in a dehydrogenation zone at a temperature of at least 400° C. a mixture of an organic compound to be dehydrogenated, oxygen, and at least about 0.0001 mol of ammonium halide per mol of said organic compound to form a gaseous dehydrogenation zone effluent at a temperature of greater than 400° C., said effluent comprising dehydrogenated organic compound, steam and ammonium halide; quenching the said effluent with an aqueous quench; in a first separating step separating from the quenched effluent a non-gaseous phase comprising at least about 25 mol percent of the ammonium halide and a gaseous phase comprising steam, the unsaturated organic compound and the remainder of the ammonium halide; in a second step condensing from about 20 to 75 mol percent of the steam from the said gaseous phase to form a condensate containing condensed steam and ammonium halide and a vapor phase comprising the unsaturated organic compound and the uncondensed steam, the ratio of the mols of ammonium halide contained in the said condensate to the mols of ammonium halide remaining in the said vapor phase being at least 10 percent greater than the ratio of the mols of steam condensed in said second step to the mols of steam remaining in said vapor phase, at least 80 mol percent of the ammonium halide originally present in the said dehydrogenation zone effluent having been removed from the gaseous phase in the first and second separation steps; and separating the unsaturated organic compound product from the said vapor phase of the second step.

2. An improved process for the dehydrogenation of hydrocarbons which comprises: heating in a dehydrogenation zone at a temperature of at least 400° C. a mixture of a hydrocarbon to be dehydrogenated, and at least about 0.001 mol of ammonium halide per mol of said hydrocarbon to form a dehydrogenation zone effluent at a temperature of greater than 400° C. comprising dehydrogenated hydrocarbon, steam, and ammonium halide; quenching the said effluent with an aqueous quench to cool the effluent to a temperature of less than 350° C.; in a first separating step separating from the quenched effluent a non-gaseous phase comprising at least 25 mol percent of the ammonium halide and a gaseous phase comprising steam, the unsaturated hydrocarbon and the remainder of the ammonium halide; in a second step condensing from about 20 to 75 mol percent of the steam from the said gaseous phase to form a condensate containing condensed steam and ammonium halide and a vapor phase comprising the unsaturated hydrocarbon and the uncondensed steam, the ratio of the mols of ammonium halide contained in the said condensate to the mols of ammonium halide remaining in the said vapor phase being at least 10 percent greater than the ratio of the mols of steam condensed in said second step to the mols of steam remaining in said vapor phase, at least 80 mol percent of the ammonium halide originally present in the said dehydrogenation zone effluent having been removed from the gaseous phase in the first and second separation steps; and separating the unsaturated hydrocarbon product from the said vapor phase of the second step.

3. An improved process for the dehydrogenation of aliphatic hydrocarbons which comprises: heating in a dehydrogenation zone at a temperature of at least 400° C. a mixture of an aliphatic hydrocarbon to be dehydrogenated, at least about 0.25 mol of oxygen per mol of said aliphatic hydrocarbon, at least two mols of steam per mol of said aliphatic hydrocarbon, and at least about 0.001 mol of ammonium halide per mol of said aliphatic hydrocarbon to form a gaseous dehydrogenation zone effluent at a temperature of at least 450° C. comprising unsaturated aliphatic hydrocarbon, a least 2 mols of steam per mol of aliphatic hydrocarbon and from 0.001 to 0.5 mol of ammonium halide per mol of aliphatic hydrocarbon; quenching the said effluent with an aqueous quench to cool the effluent to a temperature of less than 350° C.; in a first separating step separating from the quenched effluent a non-gaseous phase comprising at least about 25 mol percent of the ammonium halide and a gaseous phase comprising steam, the unsaturated aliphatic hydrocarbon and the remainder of the ammonium halide; in a second step condensing from 20 to 70 mol percent of the steam from the said gaseous phase to form a condensate containing condensed steam and ammonium halide and a vapor phase comprising the unsaturated aliphatic compound and the uncondensed steam, the ratio of the mols of ammonium halide contained in the said condensate to the mols of ammonium halide remaining in the said vapor phase being at least 10 percent greater than the ratio of the mols of steam condensed in said second step to the mols of steam remaining in said vapor phase, at least 80 mol percent of the ammonium halide originally present in the said dehydrogenation zone effluent having been removed from the gaseous phase in the first and second separation steps; and separating the unsaturated aliphatic hydrocarbon product from the said vapor phase of the second step.

4. An improved process for the dehydrogenation of aliphatic hydrocarbons which comprises: heating in a dehydrogenation zone at a temperature of at least about 400° C. a mixture of an aliphatic hydrocarbon selected from the group consisting of n-butane, n-butene and mixtures thereof, from about 0.25 to 2.5 mols of oxygen per mol of said hydrocarbon, from about 3 to 25 mols of steam per mol of said hydrocarbon, and from about 0.001 to 0.5 mol of ammonium halide per mol of said hydrocarbon to form a gaseous effluent at a temperature of greater than 450° C. comprising unsaturated aliphatic hydrocarbons, at least 2 mols of steam per mol of hydrocarbon and ammonium halide; quenching the said effluent with an aqueous quench; in a first separating step separating from the quenched effluent a non-gaseous phase comprising at least 60 mol percent of the ammonium halide and a gaseous phase comprising steam, the unsaturated aliphatic hydrocarbon and the remainder of the ammonium halide; in a second step condensing from 15 to 60 mol percent of the steam from the said gaseous phase to form a condensate containing condensed steam and ammonium halide and a vapor phase comprising the unsaturated aliphatic hydrocarbon and the uncondensed steam, the ratio of the mols of ammonium halide contained in the said condensate to the mols of ammonium halide remaining in the said vapor phase being at least 20 percent greater than the ratio of the mols of steam condensed in said second step to the mols of steam remaining in said vapor phase, at least 80 mol percent of the ammonium halide originally present in the said dehydrogenation zone effluent having been removed from the gaseous phase in the first and second separating steps; and separating the unsaturated aliphatic hydrocarbon product from the said vapor phase of the second step.

5. An improved process for the dehydrogenation of aliphatic hydrocarbons which comprises: heating in a dehydrogenation zone at a temperature of at least about 450° C. a mixture of an aliphatic hydrocarbon selected from the group consisting of n-butane, n-butene and mixtures thereof, from about 0.25 to 2.5 mols of oxygen per mol of said aliphatic hydrocarbon, from about 3 to 25 mols of steam per mol of said hydrocarbon, and from about 0.001 to 0.5 mol of ammonium bromide per mol of said hydrocarbon to form a gaseous effluent at a temperature of greater than 450° C. comprising unsaturated aliphatic hydrocarbons, at least 2 mols of steam per mol of hydrocarbon and ammonium bromide; quenching the said effluent with an aqueous quench to cool the effluent to a temperature of about 80 to 200° C.; in a first separating step separating from the quenched effluent a non-gaseous phase comprising at least about 60 mol percent of the ammonium bromide and a gaseous phase comprising steam, the unsaturated aliphatic hydrocarbon and the remainder of the ammonium bromide; in a second step condensing from 15 to 60 mol percent of the steam from the said gaseous phase to form a condensate containing condensed steam and ammonium bromide and a vapor phase comprising the unsaturated aliphatic hydrocarbon and the uncondensed steam, the ratio of the mols of ammonium bromide contained in the said condensate to the mols of ammonium bromide remaining in the said vapor phase being at least 20 percent greater than the ratio of the mols of steam condensed in said second step to the mols of steam remaining in said vapor phase, at least 80 mol percent of the ammonium bromide originally present in the said dehydrogenation zone effluent having been removed from the gaseous phase in the first and second separation steps; and separating the unsaturated aliphatic hydrocarbon product from the said vapor phase of the second step.

6. An improved process for the dehydrogenation of aliphatic hydrocarbons which comprises: heating in a dehydrogenation zone at a temperature of at least about 450° C. a mixture of an aliphatic hydrocarbon selected from the group consisting of n-butane, n-butene and mixtures thereof, from about 0.25 to 2.5 mols of oxygen per mol of said aliphatic hydrocarbon, from about 3 to 25 mols of steam per mol of said hydrocarbon, and from about 0.001 to 0.5 mol of ammonium iodide per mol of said aliphatic hydrocarbon to form a gaseous effluent at a temperature of greater than 450° C. comprising unsaturated aliphatic hydrocarbons, at least 2 mols of steam per mol of hydrocarbon and ammonium iodide; quenching the said effluent with an aqueous quench to cool the effluent to a temperature of about 80 to 200° C.; in a first separating step separating from the quenched effluent a non-gaseous phase comprising at least about 60 mol percent of the ammonium iodide and a gaseous phase comprising steam, the unsaturated aliphatic hydrocarbon and the remainder of the ammonium iodide; in a second step condensing from 15 to 60 mol percent of the steam from the said gaseous phase to form a condensate containing condensed steam and ammonium iodide and a vapor phase comprising the unsaturated aliphatic hydrocarbon and the uncondensed steam, the ratio of the mols of ammonium iodide contained in the said condensate to the mols of ammonium iodide remaining in the said vapor phase being at least 20 percent greater than the ratio of the mols of steam condensed in said second step to the mols of steam remaining in said vapor phase, at least 80 mol percent of the ammonium iodide originally present in the said dehydrogenation zone effluent having been removed from the gaseous phase in the first and second separation steps; and separating the unsaturated aliphatic hydrocarbon product from the said vapor phase of the second step.

7. An improved process for the production of butadiene-1,3 which comprises: heating in a dehydrogenation zone at a temperature of at least 450° C. a mixture of an aliphatic hydrocarbon selected from the group consisting of n-butene, n-butane and mixtures thereof, at least about 0.25 mol of oxygen per mol of said aliphatic hydrocarbon, at least two mols of steam per mol of said aliphatic hydrocarbon, and at least about 0.001 mol of ammonium bromide per mol of said aliphatic hydrocarbon to form a gaseous dehydrogenation zone effluent at a temperature of greater than 450° C. comprising hydrocarbons, butadiene-1,3, at least 2 mols of steam per mol of hydrocarbon and from 0.001 to 0.5 mol of ammonium bromide per mol of hydrocarbon; quenching the said effluent with an aqueous quench to cool the effluent to a temperature of about 80 to 150° C.; from the said effluent separating in a first step at least 60 mol percent of the ammonium bromide to produce a gaseous phase containing steam, butadiene-1,3 and the remainder of the ammonium bromide; in a second step condensing from 20 to 60 mol percent of the steam from the said gaseous phase to form a condensate containing condensed steam and ammonium bromide and a vapor phase comprising the butadiene and the uncondensed steam, the ratio of the mols of ammonium bromide contained in the said condensate to the mols of ammonium bromide remaining in the said vapor phase being at least 20 percent greater than the ratio of the mols of steam condensed in said second step to the mols of steam remaining in said vapor phase and at least 80 mol percent of the ammonium bromide originally present in the said dehydrogenation zone effluent having been removed from the gaseous phase in the first and second separation steps; feeding the condensate containing ammonium bromide obtained from the said second step to the dehydrogenation zone, and separating the butadiene product from the said vapor phase of the second step.

References Cited by the Examiner
UNITED STATES PATENTS

| | | | |
|---|---|---|---|
| 2,921,101 | 1/1960 | Magovern | 260—680 |
| 3,200,166 | 8/1965 | Bojanowski | 260—681.5 |
| 3,207,805 | 9/1965 | Gay | 260—680 |

PAUL M. COUGHLAN, JR., *Primary Examiner.*